United States Patent
Perry

(10) Patent No.: US 6,813,973 B1
(45) Date of Patent: Nov. 9, 2004

(54) DRIVE SHAFT BALANCING

(75) Inventor: Daniel C. Perry, Temperance, MI (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/644,381

(22) Filed: Aug. 20, 2003

(51) Int. Cl.[7] ............................................. F16C 3/00
(52) U.S. Cl. ................................... 74/607; 464/180
(58) Field of Search ........................ 74/573 R, 607; 464/180

(56) References Cited

U.S. PATENT DOCUMENTS

| 1,631,408 | A | * | 6/1927 | Camdon .................... 74/591 |
| 1,898,459 | A | * | 2/1933 | Newcomb .................. 74/604 |
| 2,184,734 | A | | 12/1939 | Chilton |
| 2,306,959 | A | | 12/1942 | Knibbe |
| 2,307,518 | A | | 1/1943 | Larsen |
| 2,313,024 | A | | 3/1943 | Salomon |
| 2,327,607 | A | * | 8/1943 | Saltz ........................ 451/246 |
| 3,940,948 | A | * | 3/1976 | Schultenkamper ......... 464/127 |
| 4,239,456 | A | * | 12/1980 | Joglekar et al. ........... 416/145 |
| 4,527,951 | A | | 7/1985 | Trier |
| 4,626,144 | A | | 12/1986 | Berner |
| 4,739,679 | A | | 4/1988 | Berger et al. |
| 4,776,304 | A | * | 10/1988 | Korosue ................... 123/54.2 |
| 5,234,378 | A | * | 8/1993 | Helgesen et al. .......... 464/180 |
| 5,483,932 | A | * | 1/1996 | Friedman et al. ......... 123/192.2 |
| 5,836,823 | A | * | 11/1998 | Shellaberger ............. 464/134 |
| 5,983,752 | A | | 11/1999 | Wahlstrom |
| 6,082,186 | A | * | 7/2000 | Detwiler .................... 73/66 |
| 6,164,259 | A | | 12/2000 | Brogdon et al. |
| 2003/0050127 | A1 | * | 3/2003 | Barrett et al. ............. 464/180 |
| 2003/0224862 | A1 | * | 12/2003 | Schultze ................... 464/127 |

FOREIGN PATENT DOCUMENTS

| EP | 385176 A1 | * | 9/1990 | ............ F16F/15/32 |
| JP | 2001021003 A | * | 1/2001 | ............ F16F/15/32 |

* cited by examiner

Primary Examiner—Tisha Lewis
(74) Attorney, Agent, or Firm—MacMillan, Sobanski & Todd, LLC

(57) ABSTRACT

A vehicular drive shaft assembly is balanced about an axis of rotation. The vehicular drive shaft assembly includes a drive shaft tube having a first end and a second end, with a first tube yoke including a first radially outer wall fixedly mounted to the first end of the drive shaft tube. A first balance pendulum is located radially inward of the first outer wall and rotationally fixable relative to the first tube yoke, and a second balance pendulum is located radially inward of the first outer wall and is also rotationally fixable relative to the first tube yoke. The balance pendulums can be rotated before being locked in place in order to account for imbalances in the drive shaft assembly. A second tube yoke fixedly mounted to the second end of the drive shaft tube may also include balance pendulums, similar to the first, in order to provide additional drive shaft assembly balancing capabilities.

18 Claims, 2 Drawing Sheets

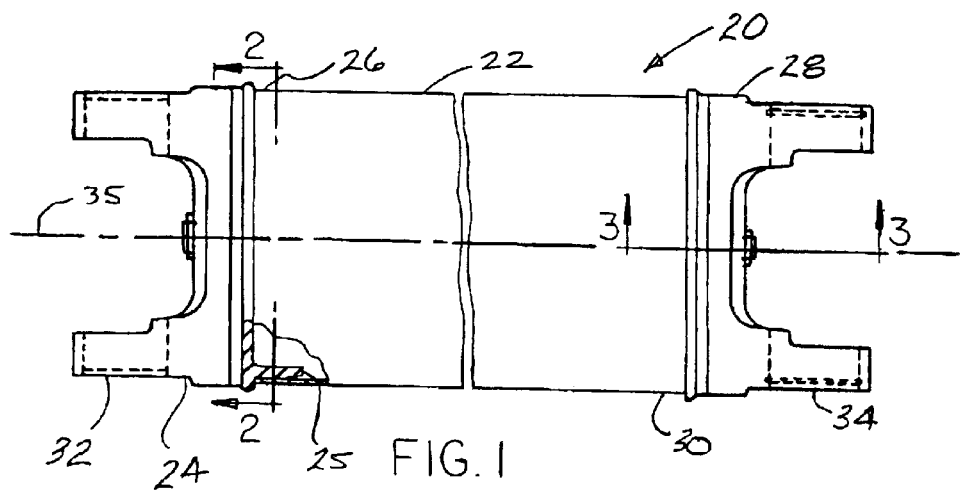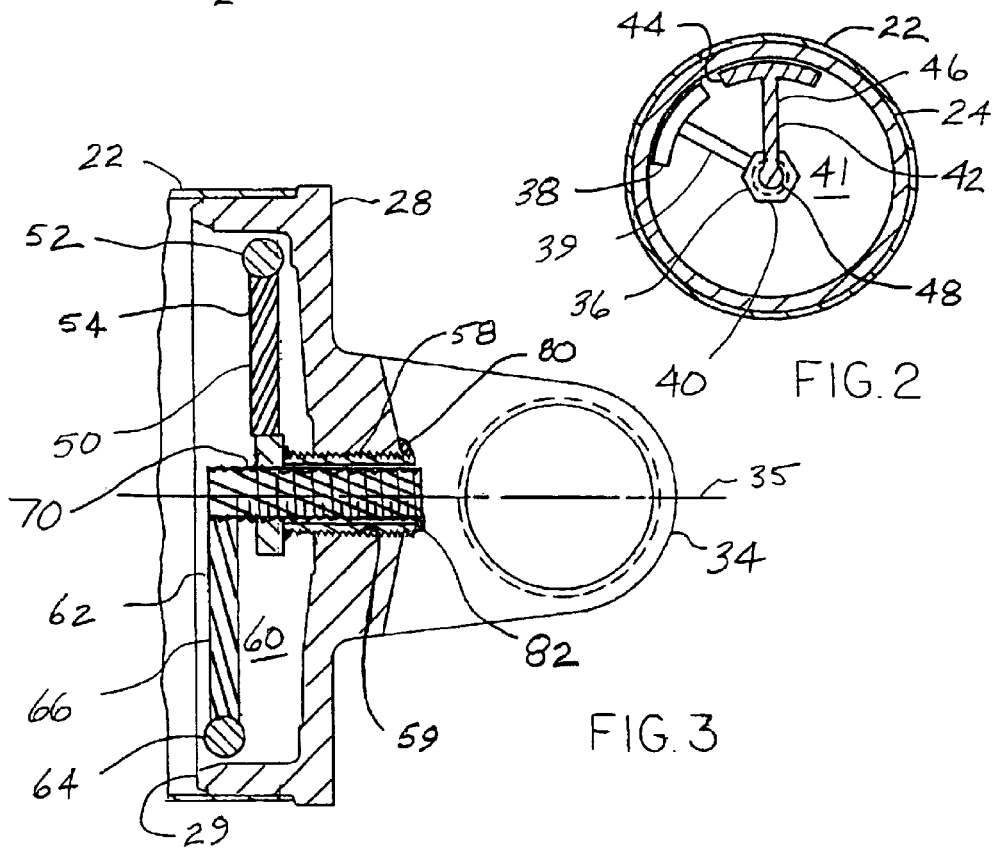

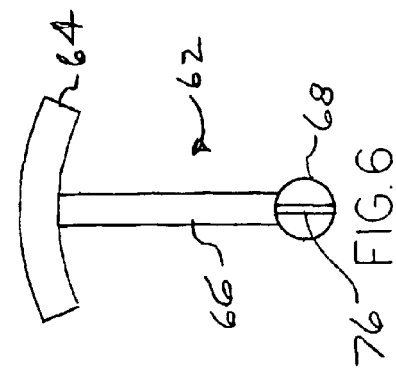
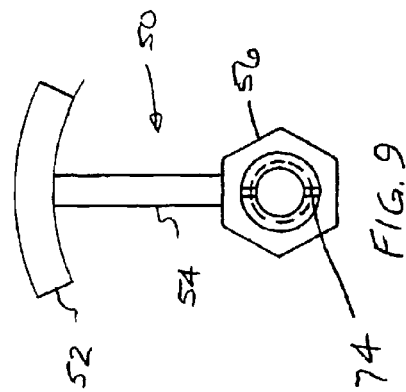
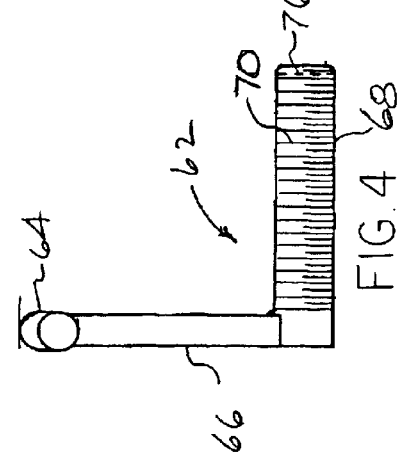
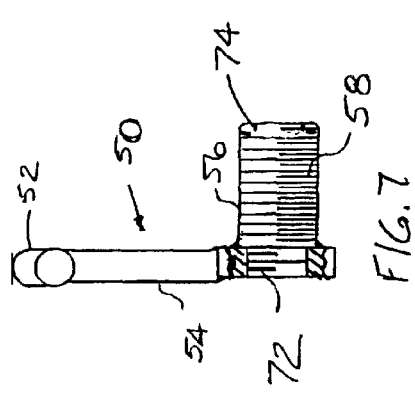
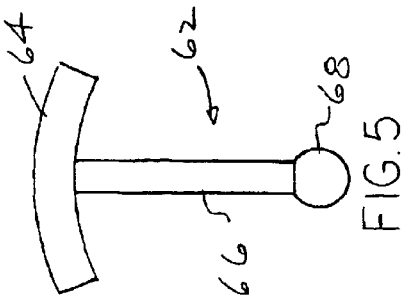
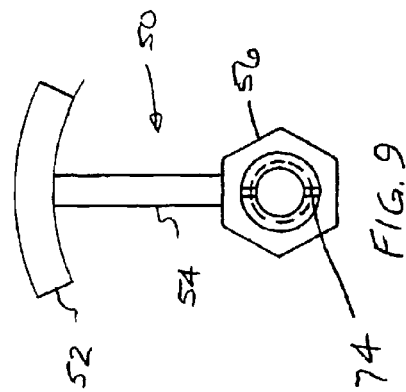

DRIVE SHAFT BALANCING

BACKGROUND OF THE INVENTION

The invention relates in general to drive shaft assemblies, such as are commonly found in the drive train systems of vehicles. In particular, this invention relates to improved balancing in such a vehicular drive shaft assembly.

A vehicle drive shaft assembly delivers torque from a driving member, such as a transmission output shaft, to a driven member, such as an input shaft to an axle assembly. In many vehicles, a drive shaft assembly includes, in part, a hollow cylindrical drive shaft tube with a tube yoke welded to each end. Each tube yoke connects to and forms a part of a universal joint (U-joint). These U-joints help provide the rotational driving connection while accommodating a limited amount of angular misalignment between the rotational axes of the members.

Often times, due to manufacturing variations, the drive shaft tube with welded-on yokes will not be balanced about the axis of rotation for this assembly. This is especially true of the yokes, which have a much more complex shape than the tube. An out of balance drive shaft can induce excessive vibrations in the drive line, which is undesirable.

A conventional way to assure a balanced drive shaft assembly is to mount a drive shaft on a balancing machine and spin it to test its balance about the axis of rotation. If found out of balance, small balancing weights are welded to the outer surface of the drive shaft tube or yokes on the lighter weight side. But this drive shaft balancing technique tends to create stress risers at the weld locations for the balance weights, which may tend to reduce the fatigue life of the drive shaft. It also creates the possibility that a balance weight may be thrown off during vehicle operation, causing the drive shaft to operate out of balance.

Thus, it is desirable to have a balanced drive shaft for use in a vehicle without the drawbacks associated with conventional drive shaft balancing.

SUMMARY OF THE INVENTION

The present invention relates to a vehicular drive shaft assembly adapted for being balanced about an axis of rotation. The vehicular drive shaft assembly includes a drive shaft tube having a first end and a second end, and a first tube yoke including a first radially outer wall fixedly mounted to the first end of the drive shaft tube. A first balance pendulum is located radially inward of the first outer wall and rotationally fixable relative to the first tube yoke, and a second balance pendulum is located radially inward of the first outer wall and rotationally fixable relative to the first tube yoke. Also a second tube yoke is fixedly mounted to the second end of the drive shaft tube.

The present invention also relates to a method for balancing a vehicular drive is shaft assembly comprising the steps of: mounting a first balance pendulum to a first tube yoke; mounting a second balance pendulum to the first balance pendulum; securing the first tube yoke to a first end of the drive shaft tube such that the first and second balance pendulums are located within the drive shaft tube; securing a second tube yoke to a second end of the drive shaft tube; measuring the out of balance of the vehicular drive shaft assembly after the first and second tube yokes have been secured to the drive shaft tube; if the vehicular drive shaft assembly measures out of balance, adjusting the orientation of at least one of the first balance pendulum and the second balance pendulum relative to the first tube yoke in response to the out of balance measurement; and rotationally fixing the first and second balance pendulums relative to the first tube yoke.

An advantage of an embodiment of the present invention is that a vehicular drive shaft assembly can be balanced about an axis of rotation without creating additional stress risers associated with conventional drive shaft balancing.

Another advantage of an embodiment of the present invention is that the vehicular drive shaft assembly can be balanced for rotation about an axis in a relatively simple and accurate manner.

A further advantage of an embodiment of the present invention is that, with the balance weights located inside of the vehicular drive shaft assembly, the weights cannot be thrown off of the assembly during vehicle operation.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a plan view of a drive shaft assembly in accordance with the present invention.

FIG. 2 is a cross section taken along line 2—2 in FIG. 1.

FIG. 3 is a cross section, on an enlarged scale, taken along line 3—3 in FIG. 1.

FIG. 4 is a side elevation view of an internal pendulum in accordance with the present invention.

FIG. 5 is a front elevation view of the internal pendulum of FIG. 4.

FIG. 6 is a rear elevation view of the internal pendulum of FIG. 4.

FIG. 7 is a side elevation view of an external pendulum in accordance with the present invention.

FIG. 8 is a front elevation view of the external pendulum of FIG. 7.

FIG. 9 is a rear elevation view of the external pendulum of FIG. 7.

DETAILED DESCRIPTION OF THE PREFERRED EMBODIMENT

Referring now to the drawings, there is illustrated in FIGS. 1–9 a drive shaft assembly 20 and its components. The drive shaft assembly 20 includes a hollow, cylindrical drive shaft tube 22. A first tube yoke 24 has a radially outer wall 25 that is secured, preferably welded, to a first end 26 of the drive shaft tube 22. A second tube yoke 28 includes a radially outer wall 29 that is secured to a second end 30 of the drive shaft tube 22. Each tube yoke 24, 28 includes a pair of lugs, 32, 34, respectively, which connect to and form a part of conventional U-joints, not shown. The drive shaft assembly 20 is designed to and preferably rotates about an axis of rotation 35 in a perfectly balanced manner. But due to imperfections in fabrication and assembly, the drive shaft assembly 20 may rotate about this axis 35 in an unbalanced manner. For these unbalanced assemblies, a means for re-balancing each assembly is needed.

A first outer balance pendulum 36 includes a balance weight 38 mounted on a pendulum arm 39, which, in turn, is mounted on an outer pendulum base 40. The outer pendulum base 40 is threaded into the first tube yoke 24 from within an internal cavity 41 formed by the radially outer wall 25. A first inner balance pendulum 42 includes a balance weight 44 mounted on a pendulum arm 46, which, in turn, is mounted on an inner pendulum base 48. The inner pendulum base 48 is threaded into the outer pendulum base 40, also from within the internal cavity 41.

By mounting the balance weights 38, 44 on pendulum arms 39, 46, respectively, the mass of each balance pendulum 36, 42 is farther from the axis of rotation 35. This provides a greater ability to adjust for an out of balance drive shaft assembly 20, for a given total mass, than if the mass is all located close to the axis of rotation 35. Also, since the tube yokes 24, 28 tend to be more of a concern with creating an out of balance drive shaft assembly 20, having the balance pendulums 36, 42 mounted to the tube yoke 24 is preferable to mounting balancing weights to the drive shaft tube 22.

A second outer balance pendulum 50 includes a balance weight 52 mounted on a pendulum arm 54, which, in turn, is mounted on an outer pendulum base 56. The outer pendulum base 56 includes external threads 58 that thread into a bore 59 in the second tube yoke 28 from within an internal cavity 60 formed by the radially outer wall 29. A second inner balance pendulum 62 includes a balance weight 64 mounted on a pendulum arm 66, which, in turn, is mounted on an inner pendulum base 68. The inner pendulum base 68 includes external threads 70 that thread into internal threads 72 in the outer pendulum base 56, also from within the internal cavity 60. As an alternative to internal and external treads on these components, they may be formed with smooth journals that fit relatively snugly together. This will also provide for the limited movement needed to hold the components together until the drive shaft assembly 20 is balanced. Then, a tack weld or adhesive can be employed to hold the components in place relative to one another.

The second outer balance pendulum 50 preferably also includes a slot 74 in the end of the base 56 that is exposed to the outside of the drive shaft assembly 20. The slot 74 provides two functions. First, it can be used to determine the orientation of the to second outer balance pendulum 50 after the first tube yoke 24 and second tube yoke 28 have been secured to the drive shaft tube 22. Second, a tool, not shown, can be inserted into the slot and rotated in order to adjust the orientation of the second outer balance pendulum 50 as needed during the drive shaft assembly balancing operation, discussed below. The slot 74 provides these functions while minimizing the amount that the base 56 extends toward the lugs 34; thus, the second outer balance pendulum 50 can perform its overall balancing function without interfering with the U-joint, not shown, that attaches to the lugs 34.

The second inner balance pendulum 62 preferably has a slot 76 in the end of the base 68 that is exposed to the outside of the drive shaft assembly 20, similar to that of the outer balance pendulum 50. The purpose of this slot 76 is the same as with the other slot 74. In this way, both the second outer and inner balance pendulums 50, 62 can be independently adjusted as needed to balance the drive shaft while not interfering with the adjacent U-joint. The first outer balance pendulum 36 and the first inner balance pendulum 42 also preferably have these types of slots for determining and adjusting their orientation after the first tube yoke 24 has been secured to the drive shaft tube 22.

The assembly and balancing of the drive shaft assembly 20 is preferably accomplished as follows. The first outer balance pendulum 36 is screwed into the first tube yoke 24 until its base 40 just slightly extends from the exterior thereof. Then, the first inner balance pendulum 42 is screwed into the first outer balance pendulum 36 until its base 56 just slightly extends from the exterior of the tube yoke 24 and the balance weight 52 of the inner pendulum 42 is about 180 degrees from the balance weight 44 of the outer pendulum 36. Alternatively, the inner pendulum 42 may be screwed into the outer pendulum 36 and aligned prior to installing the outer pendulum 36 into the first tube yoke 24. A common liquid material (not shown) for causing the threads to stick may be placed on at this time, or it may be placed on the threads of the balance pendulums 36, 42 prior to screwing them to the first tube yoke 24. The thread stick would not be meant to lock the parts in place, but to create a relatively high amount of friction so they would resist freely turning relative to one another.

The shape and size of the first outer pendulum 36 is preferably coordinated with the shape and size of the first inner pendulum 42 so that, when oriented 180 degrees from one another, they will be balanced about the axis of rotation 35. This will minimize the likelihood that the pendulums 36, 42 will cause an imbalance in the drive shaft assembly 20 as initially installed.

The same assembly procedure is then followed for the second tube yoke 28 and its balance pendulums 50, 62. The two tube yokes 24, 28 are then inserted into and welded to the respective first and second ends 26, 30 of the drive shaft tube 22.

The drive shaft assembly 20 is mounted on a conventional balancing machine (not shown) and rotated about its axis of rotation 35 in order to determine where, if any, out of balance exists. The thread stick will help keep the balance pendulums 36, 42, 50, 62 from rotating relative to each other or the tube yokes 24, 28 during the testing. If any out of balance is found, then a conventional wrench, or some other tool that will fit into the slots 74, 76, can be employed to rotated one or more of the balance pendulums 36, 42, 50, 62 in order to create a drive shaft assembly 20 that will rotate in a balanced manner about its axis of rotation 35. FIG. 3 illustrates the second balance pendulums 50, 62 still at 180 degrees, while FIG. 2 illustrates an example of the first balance pendulums 36, 42 rotated after a balance test in order to allow for an overall balanced drive shaft assembly 20.

With this invention, all four of the balance pendulums 36, 42, 50, 62 can be moved independently of each other in order to allow for balancing of the drive shaft assembly 20 about the rotation axis 35. Once balanced, the outer balance pendulums 36, 50 are preferably locked in place with a tack weld 80 (only shown for the second tube yoke 28) between each outer pendulum 36, 50 and its corresponding tube yoke 24, 28, while the inner balance pendulums 42, 62 are preferably locked in place with the tack weld 82 (only shown for the second tube yoke 28) between each inner pendulum 42, 62 and its corresponding outer pendulum 36, 50. As an alternative to the tack welds, jam nuts, a thread adhesive, or some other means may be employed to secure the balance pendulums in position. The drive shaft assembly 20 is now balanced and ready to be installed in a vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicular drive shaft assembly adapted for being balanced about an axis of rotation, the vehicular drive shaft assembly comprising:

a drive shaft tube having a first end and a second end;

a first tube yoke including a first radially outer wall fixedly mounted to the first end of the drive shaft tube;

a first balance pendulum located radially inward of the first outer wall and rotationally fixable relative to the first tube yoke;

a second balance pendulum located radially inward of the first outer wall and rotationally fixable relative to the first tube yoke; and a second tube yoke fixedly mounted to the second end of the drive shaft tube.

2. The vehicular drive shaft assembly of claim 1 wherein the second tube yoke includes a second radially outer wall that is fixedly mounted to the second end of the drive shaft tube, and wherein the vehicular drive shaft assembly further includes a third balance pendulum located radially inward of the second outer wall and rotationally fixable relative to the second tube yoke, and a fourth balance pendulum located radially inward of the second outer wall and rotationally fixable relative to the second tube yoke.

3. The vehicular drive shaft assembly of claim 2 wherein the third balance pendulum includes a base portion adjacent to the axis of rotation and mounted to the second tube yoke, a balance weight spaced from the axis of rotation, and an arm connected between the base portion and the balance weight; and the fourth balance pendulum includes a base portion adjacent to the axis of rotation and mounted to the third pendulum, a balance weight spaced from the axis of rotation, and an arm connected between the base portion of the fourth balance pendulum and the balance weight of the fourth balance pendulum.

4. The vehicular drive shaft assembly of claim 3 wherein the first balance pendulum includes a base portion adjacent to the axis of rotation and mounted to the first tube yoke, a balance weight spaced from the axis of rotation, and an arm connected between the base portion of the first balance pendulum and the balance weight of the first balance pendulum; and the second balance pendulum includes a base portion adjacent to the axis of rotation and mounted to the first pendulum, a balance weight spaced from the axis of rotation, and an arm connected between the base portion of the second balance pendulum and the balance weight of the second balance pendulum.

5. The vehicular drive shaft assembly of claim 1 wherein the first balance pendulum includes a first base portion adjacent to the axis of rotation and mounted to the first tube yoke, a first balance weight spaced from the axis of rotation, and a first arm connected between the first base portion and the first balance weight.

6. The vehicular drive shaft assembly of claim 5 wherein the second balance pendulum includes a second base portion adjacent to the axis of rotation and mounted to the first base portion, a second balance weight spaced from the axis of rotation, and a second arm connected between the second base portion and the second balance weight.

7. The vehicular drive shaft assembly of claim 6 wherein the first balance pendulum has a predetermined size and weight and the second balance pendulum has a predetermined size and weight such that, when the first balance pendulum is oriented about the axis of rotation 180 degrees from the second balance pendulum, the first balance pendulum and the second balance pendulum will be generally rotationally balanced relative to the axis of rotation.

8. The vehicular drive shaft assembly of claim 6 further includes a first tack weld located between the first base portion and the first tube yoke, and a second tack weld located between the second base portion and the first base portion.

9. The vehicular drive shaft assembly of claim 1 wherein the first balance pendulum is rotationally fixed to the first tube yoke by a first tack weld, and the second balance pendulum is rotationally fixed relative to the first tube yoke by a second tack weld.

10. The vehicular drive shaft assembly of claim 1 wherein the first tube yoke includes a threaded bore therethrough, and the first balance pendulum includes a first base having external threads thereon that thread through the bore such that the base is partially exposed outside of the drive shaft assembly.

11. The vehicular drive shaft assembly of claim 10 wherein the first base includes a slot exposed outside of the drive shaft assembly which thereby allows for detecting and adjusting the rotational position of the first balance pendulum.

12. The vehicular drive shaft assembly of claim 11 wherein the first balance pendulum includes a threaded bore therethrough, and the second balance pendulum includes a second base having external threads thereon that thread through the bore in the first balance pendulum such that the second base is partially exposed outside of the drive shaft assembly.

13. The vehicular drive shaft assembly of claim 10 wherein the first balance pendulum includes a threaded bore therethrough, and the second balance pendulum includes a second base having external threads thereon that thread through the bore in the first balance pendulum such that the second base is partially exposed outside of the drive shaft assembly.

14. The vehicular drive shaft assembly of claim 13 wherein the second base includes a slot exposed outside of the drive shaft assembly which thereby allows for detecting and adjusting the rotational position of the second balance pendulum.

15. A vehicular drive shaft assembly adapted for being balanced about an axis of rotation, the vehicular drive shaft assembly comprising:

a drive shaft tube having a first end and a second end;

a first tube yoke fixedly mounted to the first end of the drive shaft tube;

a first balance pendulum rotationally fixable relative to the first tube yoke and located within the drive shaft tube;

a second balance pendulum rotationally fixable relative to the first tube yoke and located within the drive shaft tube;

a second tube yoke fixedly mounted to the second end of the drive shaft tube;

a third balance pendulum rotationally fixable relative to the second tube yoke and located within the drive shaft tube; and a fourth balance pendulum rotationally fixable relative to the second tube yoke and located within the drive shaft tube.

16. The vehicular drive shaft assembly of claim 15 wherein the first balance pendulum includes a first base that mounts to the first tube yoke such that the base is partially exposed outside of the drive shaft assembly, and the second balance pendulum includes a second base that mounts to the first balance pendulum such that the second base is partially exposed outside of the drive shaft assembly.

17. A method of balancing a vehicular drive shaft assembly comprising the steps of:

mounting a first balance pendulum to a first tube yoke;

mounting a second balance pendulum to the first balance pendulum;

securing the first tube yoke to a first end of the drive shaft tube such that the first and second balance pendulums are located within a drive shaft tube;

securing a second tube yoke to a second end of the drive shaft tube;

measuring the out of balance of the vehicular drive shaft assembly after the first and second tube yokes have been secured to the drive shaft tube;

if the vehicular drive shaft assembly measures out of balance, adjusting the orientation of at least one of the first balance pendulum and the second balance pendulum relative to the first tube yoke in response to the out of balance measurement; and rotationally fixing the first and second balance pendulums relative to the first tube yoke.

18. The method of claim 17 further comprising the steps of:

mounting a third balance pendulum to the second tube yoke prior to securing the second tube yoke to the second end of the drive shaft;

mounting a fourth balance pendulum to the second tube yoke prior to securing the second tube yoke to the second end of the drive shaft;

if the vehicular drive shaft assembly measures out of balance, adjusting the orientation of at least one of the third balance pendulum and the fourth balance pendulum relative to the second tube yoke in response to the out of balance measurement; and rotationally fixing the third and fourth balance pendulums relative to the second tube yoke.

* * * * *